United States Patent [19]
Chapiewsky

[11] 3,807,081
[45] Apr. 30, 1974

[54] INSECT TRAP
[76] Inventor: Levi C. Chapiewsky, Bangor, Wis.
[22] Filed: Jan. 31, 1973
[21] Appl. No.: 328,460

[52] U.S. Cl. ................................................. 43/118
[51] Int. Cl. ............................................. A01m 1/10
[58] Field of Search ............................. 43/118, 121

[56] References Cited
UNITED STATES PATENTS
| | | | |
|---|---|---|---|
| 1,092,537 | 4/1914 | Raifsnider | 43/118 |
| 1,823,365 | 9/1931 | Kozlowski | 43/118 |
| 1,178,076 | 4/1916 | Jefferis | 43/118 |

Primary Examiner—Robert Peshock
Assistant Examiner—J. Q. Lever
Attorney, Agent, or Firm—John M. Diehl

[57] ABSTRACT

An insect trap primarily for flies to reduce pollution by poison insecticides. It comprises inner and outer cones of polymeric synthetic resinous material attached by clips or pins of such material to a base of such material. The device may be shipped in collapsed form, assembled by the user without tools and may be readily emptied and cleaned.

3 Claims, 6 Drawing Figures

PATENTED APR 30 1974                                                    3,807,081
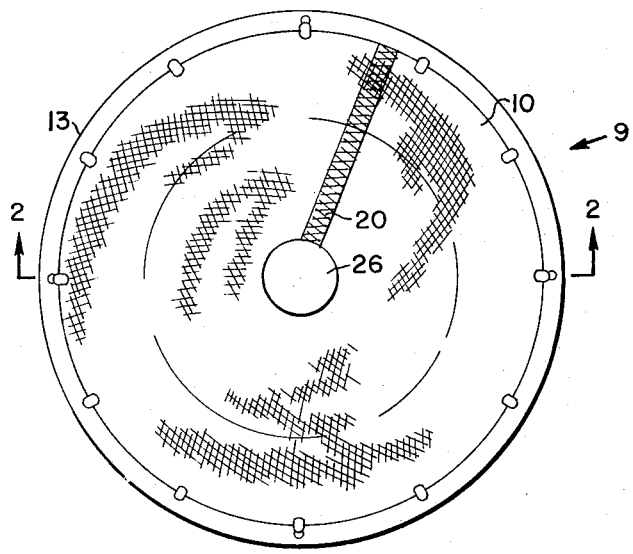
Fig. 1.
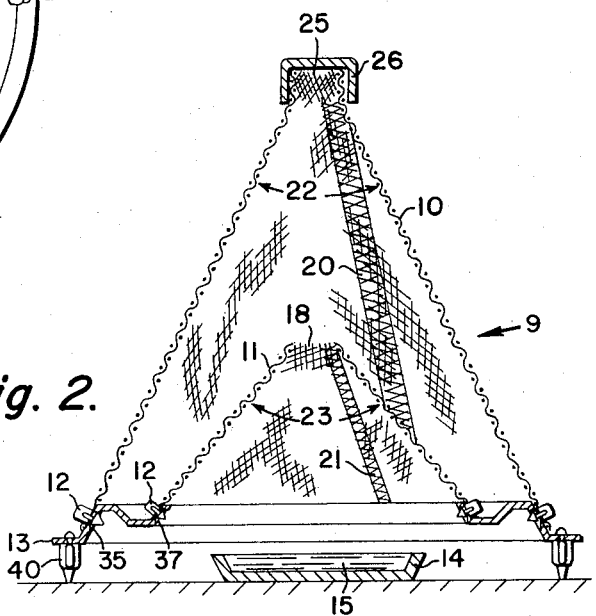
Fig. 2.
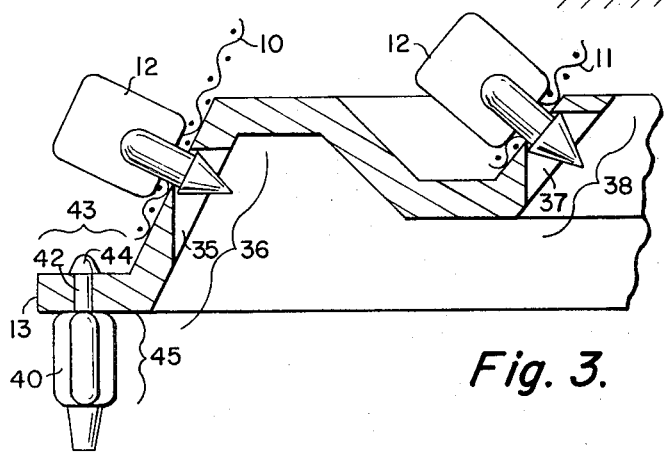
Fig. 3.
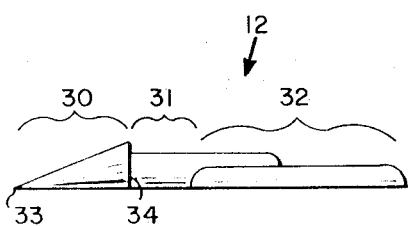
Fig. 4.
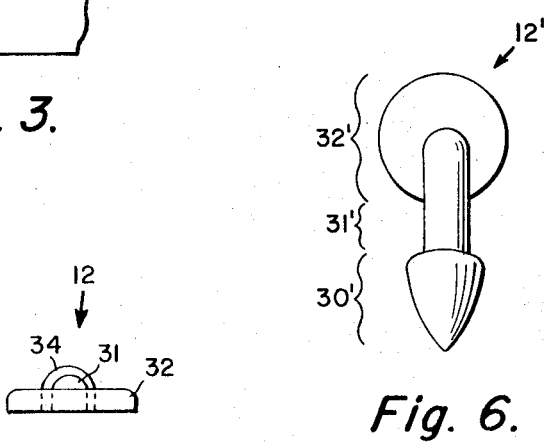
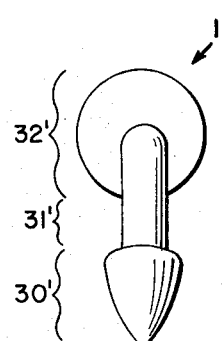
Fig. 5.   Fig. 6.

INSECT TRAP

FIELD

This invention relates to an insect trap comprising reticulated material and more particularly to such a trap which may readily be shipped collapsed and assembled without tools.

PRIOR ART

Fly traps which comprise inner and outer members of reticulated material, which may be conical, the inner having an opening at its apex through which flies enter the trap as they rise from a bait, are the subject of such early U.S. Pat. Nos. as:

137,588 (1873)
RE 6,853 (1876)
240,896 (1881)
249,931 (1881)

Collapsible traps which operate on the same principle and which can be collapsed for shipping are shown in:

U.S. Pat. Nos. 1,606,568 (1926) (inner member not reticulated); and
3,581,429 (1971)

None show the important and distinguishing features of the present invention which are described below.

SUMMARY

Insecticides in the form of poisons which may be applied in many ways, such as by spraying, have come to be relied on heavily for control of insects, including flies. Many instances have been reported of negative effects of such poisons or residuum thereof on humans, animals and even vegetation.

Such environmental pollution may be reduced by use of traps which are devoid of poisons. However, to make possible the wide spread use of traps to replace such poisons it is desired to provide an improved trap which meets the objects set forth below.

Accordingly, in a preferred embodiment of the present invention, a sheet of reticulated polymeric synthetic resinous material is cut to suitable pattern and two edges are brought together and heat sealed to provide a first conical member and a second such member, receivable within the first, is similarly provided. An annular base of polymeric synthetic resinous material such as polypropylene is provided and each of the two conical members is attached to the base with pin members.

Each pin member may comprise an enlarged portion which may have a point and a base, a shank portion of lesser width than the base and a head portion of greater width than the shank portion.

Each pin may extend through one of the reticulated openings of one of the reticulated conical members and may distort such opening and may be received in an aperture or hole in the base which is larger than the shank portion of the pin but smaller than the base of the conical portion of the pin.

The smaller conical member is provided with an aperture at its apex. The larger is preferably also provided with an opening at its apex and with a closure for this opening.

OBJECTS

It is a principal object to provide an insect trap of sufficient economic and esthetic efficiency to supplant at least in part the use of poison to control insects and to reduce the attendant environmental pollution which results from use of such poisons.

It is an object to provide an insect trap which may be utilized repeatedly, as for trapping flies, without becoming unsightly.

It is another object to provide an insect trap which may be shipped in collapsed or dissambled condition in a package of minimum dimensions.

It is another object to provide an insect trap which may be readily emptied.

Further objects will become apparent from the following detailed description.

DRAWINGS

In the drawings like numerals refer to like parts and:

FIG. 1 is a plan view of a preferred embodiment;
FIG. 2 is a cross-sectional view taken on lines 2—2 in FIG. 1;
FIG. 3 is an enlarged cross-sectional view of a portion of the view of FIG. 2;
FIG. 4 is an elevation of an attaching pin;
FIG. 5 is an end view of the pin of FIG. 4; and
FIG. 6 is a plan view of a modification of the pin of FIGS. 4 and 5.

DETAILED DESCRIPTION

Referring now to the Figures, an insect trap which is particularly adapted to serve as a fly trap is indicated generally as 9. Trap 9 comprises outer conical reticulated member 10 and inner conical reticulated member 11, both of which may be attached to annular base member 13, as, for example, by pins 12 as hereinafter described.

A container 14 such as a saucer or disposable dish which may be polymeric synthetic resinous material may be placed under trap 9 and may contain any suitable material 15 which is attractive to the insects to be trapped, i.e., bait, for example, sugar syrup. Insects of any type and particularly flies fly upward when leaving the bait and a large portion of them pass through aperture 18 provided at the apex of reticulated conical member 11 and thence into the interior of the trap. Only a very small portion of the insects which enter the interior of the trap succeed in leaving the trap through the only possible exit, namely aperture 18 through which they entered.

Normally, a large portion of insects which succeed in avoiding entrance to the trap when initially leaving the bait return to the bait subsequently and thereafter enter the trap. Also, many of the insects which succeed in leaving the trap reenter it subsequently and remain there.

Trapped flies die within the trap, normally within a few hours and it is not necessary to provide means within the trap to kill them. Such death is attributed to starvation in U.S. Pat. No. 3,505,757 but it seems equally likely that death results in more cases from dehydration as a result of deprivation of liquid combined with relatively high temperature. Flies notoriously live for months in a state of hibernation or perhaps a state corresponding to hibernation, without food or water, when maintained at temperatures of about 33°F. to 50°F. and when unmolested and protected from light, as in cracks around windows in old frame construction.

However, if the temperature is high enough for flies to be active, it is high enough to provide for their death in the trap.

Advantages of the invention, apart from the critical and basic fact that it provides means for controlling flies by eliminating a portion of the population without poisoning or otherwise polluting the environment or portions thereof, include the facts that the trap can be readily assembled without from a knocked-down kit which itself is easily shippable and storable. Further advantages include the ease with which it can be cleaned. A further advantage is that it can be made, shipped, stored, retailed and assembled very economically and therefore is semi-disposable; after on or two cleanings (or in some instances none) it can be economically discarded.

Its capacity for killing flies is large compared with its original cost and cost of maintenance, whether it is cleaned many times before discarding or discarded without cleaning and thus it provides a saliently economical method of fly control.

These advantages are provided in part by providing conical members 10 and 11 of fusible polymeric synthetic resinous material such as propylene. Thus the conical members may be conveniently cleaned in most instances merely by inverting the trap and directing a stream of water at it as from a garden hose. If necessary, detergent may be applied and scrubbing carried out without damage to the device and with high effectiveness because of the ease of removal of attached dirt. Each of members 10 and 11 is provided with a heat sealed or otherwise fused seam respectively 20 and 21 whereby maximum utility in fly retention and maximum utility in converting flat material to conical shape are provided. Member 10 may have an included apex angle 22 of from about 40° to about 110° and in a particularly suitable embodiment angle 22 is about 53°. Member 11 may have an included apex angle 23 which is the same as that of member 10 but preferably has a greater angle, most suitably from about 15° to about 40° greater. Thus in an embodiment wherein angle 22 is about 53°, angle 23 may suitably be about 80°.

Member 10 is preferably provided at its apex with opening 25 which may be provided with closure 26. The contents of the trap may thus be removed readily and conveniently by removing closure 26 and inverting the trap. By reason of the nature of the material used for the trap, dead flies do not readily adhere thereto and the trap may thus be emptied easily, quickly and relatively completely.

Attachment of members 10 and 11 to base 13 is relatively critical because it makes possible the collapsability of the device and assemblability without tools. A plurality of attaching pins 12 or 12' are provided, each of which comprises an enlarged portion 30 or 30', a shank portion 31 or 31' and a head portion 32 or 32'. Enlarged portion 30 or 30' has a maximum width greater than the width of shank 31 or 31'. Enlarged portion 30 may be generally partially conical in shape and may have a tip 33 and a base 34 and in this instance base 34 is the part of portion 30 which is greater in width than shank 31.

Each of pins 12 or 12' is provided with a head 32 or 32' which may be of any shape suitable for gripping without fingers and which is of greater width than shank 31 or 31'.

Base member 13 is provided with a ring of holes 35 corresponding to the base of member 10. The ring of holes 35 is preferably provided or received in an annular conical ring portion 36 of base member 13 which may correspond in slope (has the same or about the same included apex angle as angle 22) to the slope of member 10.

Base member 13 is also provided with a ring of holes 37 corresponding to the base of member 11. The ring of holes 37 is preferably received or provided in an annular conical ring portion 38 of base 13. The slope of portion 38 may correspond to the slope of member 11, i.e., portion 38 may have an included apex angle equal to or about equal to angle 23.

The width of holes 36 and 37 (diameter if they are round) is just a little greater than the width of shanks 31 or 31', which may be round but are not shown as such. Each of heads 32 or 32' is, of course, greater in width than one of holes 36 or 37.

In use, enlarged portion 30 or 30' of each of pins 12 is inserted through an aperture in the reticulated structure of member 10 or 11 and may distort it greatly, slightly or not at all. It is then pushed through one of holes 35 and 37 until portion 30 or 30' has passed through the narrowest part of the hole, the springiness of the material of which base 13 and pins 12 is made facilitating such insertion. Due to the width relation between portion 30 or 30' and holes 35 or 37 the pins remain in place and can be withdrawn only with difficulty.

Legs 40 may be provided to space base 13 apart from the surface 41 on which it rests. Legs 40 may have shank portions 42 which may be received in holes in a flat annular portion 43 of base 13. The legs 40 may be retained in place by enlarged portions 44 of slightly greater width than the holes which receive shanks 42 and by bottom enlarged portions 45 which may be wider than said holes as shown.

Modifications will be apparent to those skilled in the art and are intended as being within the scope of the description to the extent defined by the claims.

Having thus described my invention, I claim:

1. In an insect trap, the combination of:
    a first conical reticulated member of polymeric synthetic resinous fusible material having a fused seam,
    a second conical reticulated member of polymeric synthetic resinous fusible material having a fused seam and having an aperture at its apex,
    a plurality of attaching members of polymeric synthetic resinous material, each having
        an enlarged tip,
        a shank of less width than the tip, and
        a head of greater width than the shank,
    an annular base of polymeric synthetic resinous material comprising a first ring of holes corresponding to the base of said first conical member and a second ring of holes corresponding to the base of said second conical member,
    said holes having a width greater than said shank and less than said tip and less than said head.

2. The device of claim 1 wherein said base is characterized by comprising a first annular conical ring portion corresponding in slope to the slope of said first conical reticulated member and having said first ring of holes received therein and a second annular conical ring portion corresponding in slope to the slope of said second conical reticulated member and having said second ring of holes received therein.

3. The device of claim 1 wherein said base is provided with a third ring of holes and leg members are provided which are receivable therein.

* * * * *